UNITED STATES PATENT OFFICE.

HUGO SCHNEIDER, OF STRASBURG, GERMANY.

SUBSTITUTE FOR GUTTA-PERCHA.

SPECIFICATION forming part of Letters Patent No. 651,582, dated June 12, 1900.

Application filed November 21, 1899. Serial No. 737,812. (No specimens.)

*To all whom it may concern:*

Be it known that I, HUGO SCHNEIDER, engineer, a subject of the German Emperor, residing at No. 7 Steinring, Strasburg, Alsace, Germany, have invented certain new and useful Improvements in Substitutes for Gutta-Percha for Coating Cables and for other Purposes; and I do hereby declare the following to be a full, clear, and exact description of the invention, such as will enable others skilled in the art to which it appertains to make and use the same.

In order to manufacture my improved substitute for gutta-percha, I employ a mixture of about forty-five per cent. of asphalt-tar, (pissasphaltum,) forty per cent. of resin, ten per cent. of spirits of turpentine, and five per cent. of linseed-oil. After having brought the asphalt-tar to boiling-point the resin is added, and when an intimate mixture of the two substances has been obtained the spirits of turpentine is added first and then the linseed-oil, after which the entire mixture is well boiled.

Having thus particularly described and ascertained the nature of my said invention and in what manner the same is to be performed, I declare that what I claim is—

As a substitute for gutta-percha, a composition of matter, prepared substantially as described from forty-five per cent. of asphalt-tar, forty per cent. of resin, ten per cent. of spirits of turpentine, and five per cent. of linseed-oil, as specified.

In testimony that I claim the foregoing as my invention I have signed my name in presence of two subscribing witnesses.

HUGO SCHNEIDER.

Witnesses:
R. HOELGER,
MAX ADLER.